(12) United States Patent
Stuhec et al.

(10) Patent No.: US 8,954,378 B2
(45) Date of Patent: Feb. 10, 2015

(54) DATA MODEL OPTIMIZATION

(75) Inventors: Gunther Stuhec, Heidelberg (DE); Florian Gessner, Heidelberg (DE); Jens Lemcke, Karlsruhe (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/596,532

(22) Filed: Aug. 28, 2012

(65) Prior Publication Data

US 2012/0324588 A1    Dec. 20, 2012

Related U.S. Application Data

(63) Continuation of application No. 12/269,324, filed on Nov. 12, 2008, now Pat. No. 8,290,989.

(51) Int. Cl.
G06F 17/00 (2006.01)
G06F 17/30 (2006.01)

(52) U.S. Cl.
CPC ................................ *G06F 17/30607* (2013.01)
USPC .......................................... 707/602; 717/126

(58) Field of Classification Search
USPC .......................................... 707/774, 616, 602
See application file for complete search history.

(56) References Cited

U.S. PATENT DOCUMENTS

| | | | |
|---|---|---|---|
| 6,775,663 B1 * | 8/2004 | Kim | ................................... 707/3 |
| 2006/0080419 A1 | 4/2006 | Patrick et al. | |
| 2006/0265690 A1 * | 11/2006 | Motoyama et al. | ........... 717/117 |
| 2008/0147713 A1 | 6/2008 | Lemcke et al. | |
| 2010/0121864 A1 | 5/2010 | Stuhec et al. | |

OTHER PUBLICATIONS

Shimon Rura, "Refactoring Aspect-Oriented Software", 2003.
Rodriquez et al., Determining Semantic Similarity among Entity Classes from Different Ontologies, 2003, IEEE.
Park et ai., "Object-Oriented Model Refinement Technique in Software Reengineering", 2002, IEEE.
Hall, "A semantic Similarity Measure for Formal Ontologies", 2002, IEEE.
Peh et al., "Doman-Specific Semantic Class Disambiguation Using WordNet", 1997.
Gunther Stuhec., "Real and Effective Use of Business Vocabularies", 2005, SAP AG.
OASIS, "Universal Business Language Naming and Design Rules", 2004.
Deissenboeck et ai., "Concise and Consistent naming", 2006.
Minegish et ai., "Acquiring and Refining Class Hierarchy Design of Web Application Integration Software", 2004.
Kashyap et al., "Semantic and schematic similarities between database objects: a context-based approach", 2004.

(Continued)

*Primary Examiner* — James Trujillo
*Assistant Examiner* — Dawaune Conyers

(57) ABSTRACT

A name of one or more entity classes of the data model may be refined to conform to a naming convention. A semantic meaning of each of the names and one or more attributes of each entity class may be determined. It may be determined that the name of a first entity class is semantically similar to the name of a second entity class based on a semantic distance between the semantic meaning of the names, where a substantial similarity may be determined between the first entity class and the second entity class by comparing the semantic meaning of the one or more attributes of the first entity class to the semantic meaning of the one or more attributes of the second entity class. The data model may be normalized based on the substantial similarity.

20 Claims, 9 Drawing Sheets

(56) References Cited

OTHER PUBLICATIONS

Dig et ai.,"Automatic Detection of Refactorings for Libraries and Frameworks", 2005.
Koni-N'Sapu, "A Scenario Based Approach for Refactoring Duplicated Code in Object Oriented Systems", 2001.
Xing et al., "UMLDiff: An Algorithm for Object-Oriented Design Differencing", 2005.
Notice of Allowance for U.S. Appl. No. 12/269,324, mailed Jun. 11, 2012, 15 pages.
Final Office Action for U.S. Appl. No. 12/269,324, mailed Aug. 17, 2011, 34 pages.
Non-Final Office Action for U.S. Appl. No. 12/269,324, mailed Feb. 3, 2012, 36 pages.
Non-Final Office Action for U.S. Appl. No. 12/269,324, mailed Feb. 17, 2011, 37 pages.
Non-Final Office Action Response for U.S. Appl. No. 12/269,324, filed Jun. 3, 2011, 15 pages.
Non-Final Office Action Response for U.S. Appl. No. 12/269,324, filed Jan. 10, 2012, 20 pages.

\* cited by examiner

DATA MODEL OPTIMIZATION

CROSS-REFERENCE TO RELATED APPLICATION

This application is a continuation of, and claims priority to, U.S. patent application Ser. No. 12/269,324, filed on Nov. 12, 2008, entitled "DATA MODEL OPTIMIZATION", now issued as U.S. Pat. No. 8,290,989, which is incorporated by reference herein in its entirety.

TECHNICAL FIELD

This description relates to the optimization of data models.

BACKGROUND

Data models may be used to organize or structure data about one or more business systems. Over time, as businesses grow and become more sophisticated, so too may their data models grow as well. This growth of the data models may cause the data models to develop redundancies, deep levels of recursive hierarchies and other inefficiencies. Such inefficiencies also may be introduced when two or more data models are merged into one such as, for example, when one business buys or merges with another.

One of the challenges in removing these inefficiencies from the data models is that often times the names and structure of the data model may be closely integrated with the semantics and linguistics of the particular business system. It would be beneficial to have a system capable of identifying semantic similarities and/or differences across one or more data models based on the semantic meanings of the objects, to optimize (e.g., identify and remove these inefficiencies) one or more data models.

SUMMARY

According to one general aspect, a computer-implemented method for normalizing a data model of one or more entity classes is provided, where each entity class may include a name and one or more attributes. The name of each of the entity classes may be refined to conform to a naming convention. A semantic meaning of each of the refined names and the one or more attributes of each entity class may be determined. It may be determined that the name of a first entity class is semantically similar to the name of a second entity class based on a semantic distance between the semantic meaning of the name of the first entity class and the semantic meaning of the name of the second entity class. A substantial similarity may be determined between the first entity class and the second entity class based on a comparison of the semantic meaning of the one or more attributes of the first entity class to the semantic meaning of the one or more attributes of the second entity class. The data model may be normalized based on the substantial similarity.

According to another general aspect, a computer-implemented method for recursively refining names of one or more entity classes of a data model based on a naming convention is provided, where each of the names may include one or more terms. Invalid terms may be removed from the one or more terms of the names. A complex term in one or more of the names may be identified, where the complex term may include a combination of two or more simpler terms. The identified complex term in the names may be separated to reflect the two or more simpler terms. For each of the names including two or more terms, a semantic distance between the two or more terms of the name may be determined. From each of the names including two or more terms, one or more terms with the semantic distance being greater than a threshold semantic distance may be removed.

According to another general aspect, a computer-implemented method for normalizing a first entity class of a data model having a plurality of entity classes is provided, where each of the entity classes may include a name and one or more attributes. It may be determined that the names of the plurality of entity classes and the one or more attributes conform to a core component technical specification (CCTS) naming convention, where each name and attribute may include an object term, a property qualifier and a property term. It may be determined that each of the one or more attributes of the first entity class includes a unique property qualifier. It may be determined that none of the plurality of entity classes includes multiple attributes that are substantially similar to the one or more attributes of the first entity class. For each of the one or more attributes of the first entity class, a first medial distance between the attribute of the first entity class and the name of the first entity class may be determined, and a second medial distance between the attribute of the first entity class and the names of one or more entity classes, from the plurality of entity classes, associated with the first entity class, may be determined based on a semantic distance between the object terms, property qualifiers and property terms. For each of the one or more attributes of the first entity class, the first entity class may be normalized such that the first medial distance between the attribute and the first entity class is less than the second medial distance between the attribute and any of the one or more associated entity classes.

The details of one or more implementations are set forth in the accompanying drawings and the description below. Other features will be apparent from the description and drawings, and from the claims.

DETAILED DESCRIPTION

Figure 1:
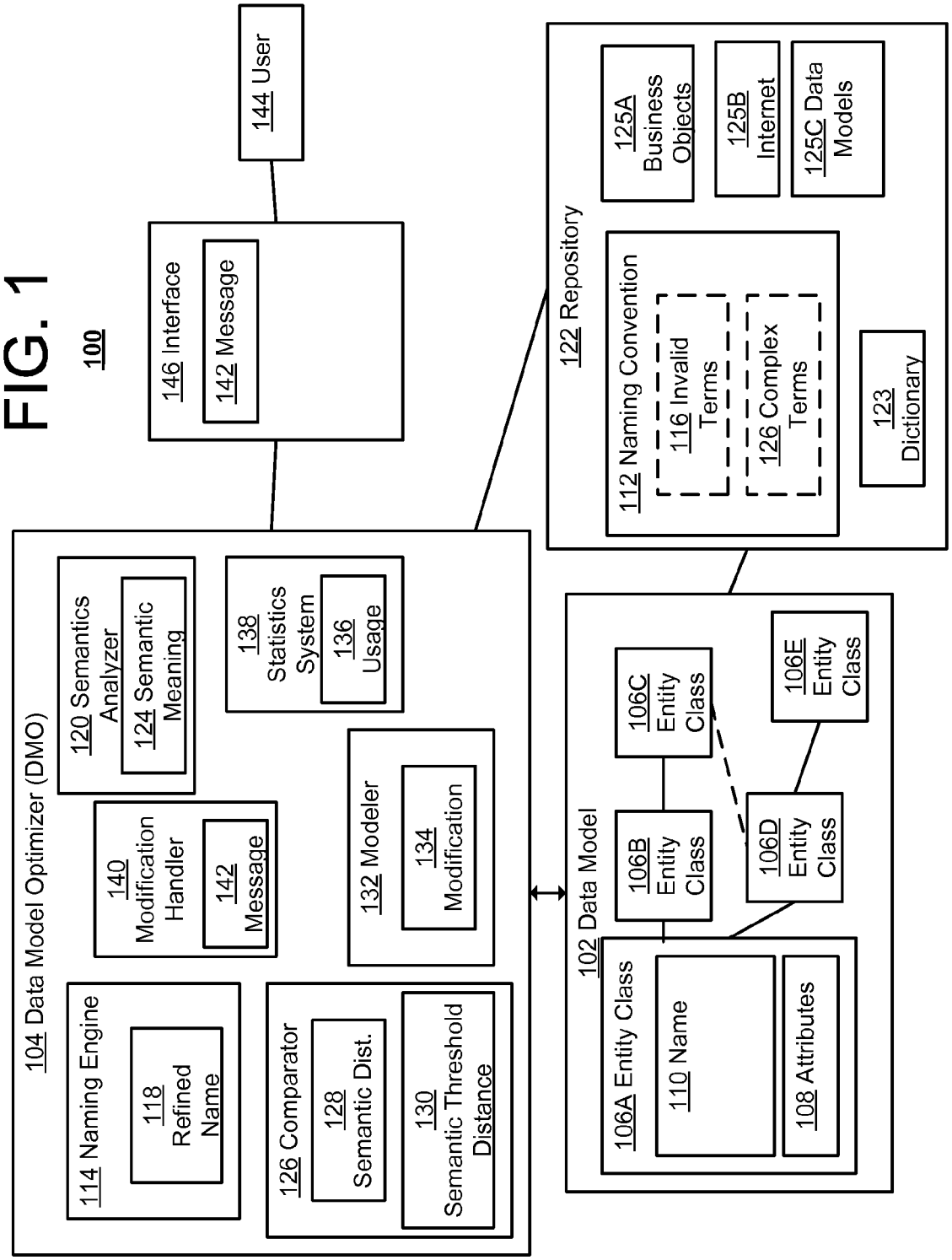
FIG. 1 is a block diagram of an example system for optimizing a data model.

FIG. 1 is a block diagram of an example system 100 for optimizing a data model 102. The system 100 may include a data model optimizer 104 (hereinafter, "DMO 104") that may normalize, consolidate, harmonize and/or otherwise optimize the data model 102. The DMO 104 may compare entity classes 106A-E of the data model 102 to each other, and based on semantics used to describe the entity classes 106A-E, attributes 108 of the entity classes 106A-E and relationships between the entity classes 106A-E, may optimize the data model 102. Such optimization may include, for example, reducing redundancy between the entity classes 106A-E, flattening a hierarchy of the data model 102, normalizing the data model 102 and increasing reuse among the objects of the data model 102.

The data model 102 may include an organization and structure of data. The data model 102 may include a description or representation of entities or objects of a data structure and the relationships that exist among them. The data model 102 may map concepts and relationships and describe the semantics of a business system, or otherwise provide a conceptual schema of the system. The data model 102 may include, for example, descriptions of objects of significance to an organization about which it may collect information (e.g., entity classes 106A-E), characteristics of the objects of significance (e.g., attributes 108) and associations between the objects (e.g., relationships between the entity classes 106A-E).

The entity classes 106A-E may include main objects, classes and/or concepts of the data model 102 and may represent generic real-world objects. The entity classes 106A-E may identify which concepts represented by the data model 102 are of the greatest importance and may provide a structure by which data may be associated with those concepts and may be organized within the data model 102. For example, a data model 102 of a business organization may include entity classes 106A-E pertaining to customer information, sales associates, sales territories, sales leads and invoices.

For example, as just referenced, the data model 102 may represent a business system in which sales leads are generated, estimates provided, services or products are rendered and invoices are generated, among other activities. Then, for example, the entity classes 106A-E of the data model 102 may include customer information 106A, price estimates 106B, sales orders 106C, invoices 106D and payment receipts 106E. In other exemplary implementations, the entity classes 106A-E may include additional and/or different entity classes as may be deemed appropriate per the represented system or data.

The attributes 108 may include defined characteristics or properties of the entity classes 106A-E. The attributes 108 may include members of or informational subsets of the broader entity class concepts. For example, an entity class 106A for storing customer information may include the attributes 108 first name, last name, prefix, address and credit score.

Relationships between the entity classes 106A-E may indicate explicit and/or implicit constraints and/or limitations on the data of the data model 102. The relationships may be indicated, in the example of FIG. 1, by the lines shown connecting the entity classes 106A-E within the data model 102. A relationship may indicate a dependency or inheritance between two or more of the entity classes 106A-E, such as a parent-child relationship. For example, the entity class 106A may be associated with general vehicle identification information and the entity class 106B may be more particularly associated with truck information. Then for example, the entity class 106B may inherit attributes 108 of the entity class 106A, whereby a truck is a type of vehicle and a relationship line may indicate such a dependency within the data model 102. In other exemplary implementations, the relationships may indicate associations other than the parent-child, or other dependency or inheritance relationship, between two or more of the entity classes 106A-E.

The entity classes 106A-E may each have a name 110. The name 110 may indicate an identification of the entity classes 106A-E. For example, the entity class 106D may be associated with payment(s) received from customers and thus may include the name 110 Payment_History. Generally, to improve clarity of the data model 102, the names 110 may be associated with or otherwise indicate the concept related to the entity classes 106A-E; however, entity classes 106A-E with seemingly irrelevant and/or redundant names 110 also may exist in the data model 102.

The data model optimizer 104 (DMO 104), as referenced above, may optimize the data model 102. Such optimization may include adding, removing or otherwise modifying the entity classes 106A-E, attributes 108, names 110 and/or relationships of the data model 102. The DMO 104 may, through the use of one or more components, refine the names 110 and/or attributes 108 to conform to a naming convention 112, determine the semantics used in naming the entity classes 106A-E and attributes 108 of the data model 102, compare the semantics to the relationships between the objects of the data model 102 and determine and perform one or more optimization and/or normalization procedures on the data model.

The DMO 104 may include a naming engine 114, a semantics analyzer 120, a comparator 126, a modeler 132, a statistics system 138 and a modification handler 140. The DMO 104 may interface with a repository 122, where the repository 122 may include the naming convention 112. The repository 122, among other things, may include information that may be used and/or referenced by the DMO 104 to determine the semantics of the data model 102.

The naming convention 112 may include a standard or criterion associated with naming objects of the data model 102. The naming convention 112 may provide a syntax-neutral and technology-independent way to improve reuse, interoperability and consistency across the entity classes 106A-E and/or attributes 108 of the data model 102. An example naming convention 112 may include the core component technical specification (CCTS).

Figure 2:
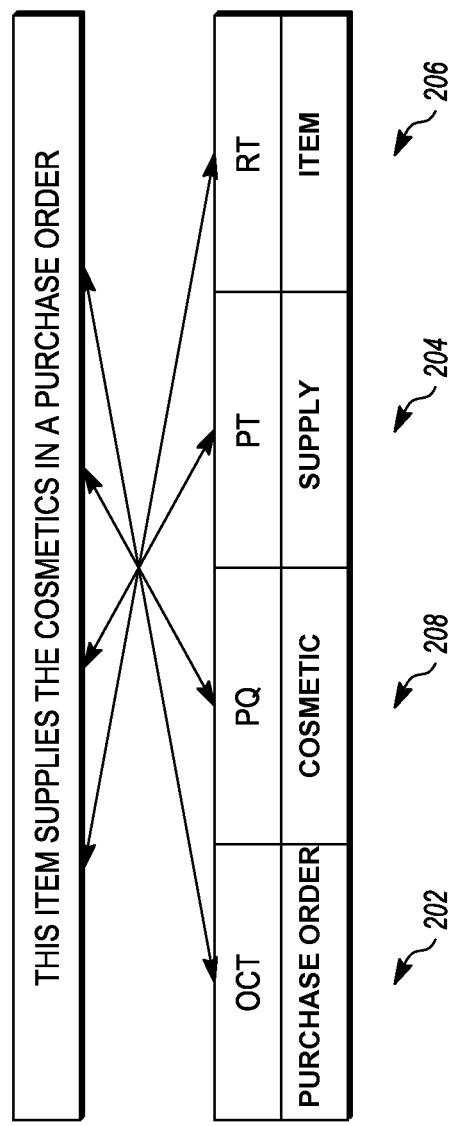
FIG. 2 is an example implementation of a naming convention, according to an example embodiment.

According to an example embodiment, the naming convention 112 may include a three-part naming convention. As shown in FIG. 2, the three-part naming convention, or dictionary entry name (DEN) may use data elements similar to those used in formulating sentences. The DEN may include three main components, an object term or object class term (OCT) 202, a property term (PT) 204 and a representation term (RT) 206. The DEN, in other implementations, may include additional terms such as a property qualifier (PQ) 208. As shown in FIG. 2, each DEN component may map to a portion of a natural language sentence. The OCT 202 may correspond to the object "purchase order" of the sentence, the PT 204 may correspond to the verb "supply" of the sentence, the RT 206 may correspond to the subject "item" of the sentence and the PQ 208 may correspond to the predicate of the sentence.

Using the DEN approach (e.g., naming convention 112) may allow the names 110 of the entity classes 106A-E to be based on natural language and implemented in a standard form. The DEN approach may allow for a more precise method of naming the entity classes 106A-E and attributes 108, where the semantics of each component (e.g., 202, 204, 206 and 208) may be processed individually and/or as a group by the DMO 104.

In FIG. 1, the naming engine 114 may be configured to refine the names 110 (and attributes 108) of the data model 102 to conform to the naming convention 112. The naming engine 114 may add, remove or otherwise modify characters or terms of the names 110 to conform them to the naming convention 112. For example, the naming convention 112 may prohibit one or more invalid terms 116 from appearing in the names 110.

The invalid terms 116 may include any combination of one or more letters, symbols, whitespace, numbers or other characters that may not to be included in names conforming to the naming convention 112. For example, the invalid terms 120 may include the terms " " (e.g., whitespace) and "_". Then, for example, the naming engine 114 may parse the names 110 for the invalid terms 116. If the naming engine 114 finds an invalid term 116 within the name 110, the naming engine 114 may remove the invalid term 116 from the name 110.

The naming engine 114 may produce a refined name 118. The refined name 118 may include the name 110, after processing by the naming engine 114, as it conforms to the naming convention 112. For example, the name 112 of the entity class 106C may be "Customer Information". Then, for example, the naming engine 114 may apply the rules or standards of the naming convention 112 (e.g., no invalid terms 116) and may produce the refined name 118 "CustomerInformation". It is possible that the refined name 118 may include the name 110 without any modification, for instance, if the naming engine 114 determines the name 110 already conforms to the naming convention 112 or the recommended modifications were rejected.

The semantics analyzer 120 may be configured to compare the refined names 118 to the repository 122 to determine a semantic meaning 124 of the refined names 118. The repository 122 may include a library of various components or resources that may be used to determine the semantic meaning 124 of the names 110 and/or attributes 108. The repository 122 may include a dictionary 123 such as, for example, the WordNet® dictionary that may determine associations between words or terms. For example, the dictionary 123 may include terms of words that may be connected through various relationships, including synonyms, homonyms and antonyms. Then, for example, the semantic analyzer 120 may compare one or more portions of the refined name 118 to the repository 122, including the dictionary 123, to determine the semantic meaning 124. The WordNet® dictionary (e.g., 123) may include multiple synonym sets for determining the semantic meanings or semantic distance 128 between words or terms. The repository 122, including the WordNet® dictionary, is further discussed below with reference to FIG. 3.

In addition to including the dictionary 123, the repository 122 may include business objects 125A, the Internet 125B, data models 125C and/or any other combination or resources that may be used to determine the semantic meaning 124 of one or more words. The business objects 125A may include entity classes (e.g., 106A-E) or business documents used in one or systems. For example, the business objects 125A may include a sales estimate form. The Internet 125B may include any resources available via the Internet, including the WordNet® dictionary (e.g., dictionary 123). The data models 125C may include any additional or existing data models 102 that may be stored in the repository 122. Though discussed with reference to a single data model 102, it should be understood that the data model 102 may refer to several data models 102 that are to be combined in some way and optimized by the DMO 104.

The semantic meaning 124 may include an interpretation of the linguistics or semantics used in the refined name 118. The semantic meaning 124 may include, for example, a set of synonyms or other words that may be semantically relevant to one or more terms of the refined name 118. For example, the refined name 118 "Customer" may result in the semantic meaning 124 "client, consumer and purchaser". Example operations related to determining the semantic meaning 124 are discussed below in greater detail in reference to FIG. 9.

The naming engine 114 may use the semantic meaning 124 to further refine the refined name 118 per the naming convention 112. The naming convention 112 may prohibit complex terms 126 whereas, based on the semantic meaning, 124 the naming engine 114 may identify and remove complex terms 126 from the refined names 118.

The complex terms 126 may include a combination of two or more terms that may be prohibited by the naming convention 112. The complex terms 126 may include a combination of two or more terms with two or more distinct semantic meanings 124 that are joined together as a complex term but may retain the two or more distinct semantic meanings 124. For example, an unacceptable complex term 126 may include StreetAddress, where the combination of the term "Street" with the term "Address" is unacceptable because both terms when joined, as a complex term, retain their separate meanings. The naming engine 114 may compare the semantic meaning 124 of "Street" and "Address" with "StreetAddress" to determine a complex term 126 exists. The naming engine 114 may then, for example, split "StreetAddress" into two simpler terms "Street" and "Address". Then for example, the naming engine 114 may determine that "Street" is part of "Address", and thus "StreetAddress" may be simplified to the refined name 118 "Address". In another example, an acceptable complex term may include PostOfficeBox, where the combination of the terms "PostOffice" (or even "Post" and "Office") and "Box" when combined, create a new joined meaning in "PostOfficeBox", where "PostOfficeBox" may have a singular and distinct semantic meaning 124.

The comparator 126 may be configured to determine a semantic distance 128 between the terms within a refined name 118 and/or between two or more names 110 or attributes 108. The semantic distance 128 may include an indication of the distance or variance between the semantic meaning 124 of two or more terms. For example, the semantic distance 128 may indicate that the distance between "Vehicle" and "Truck" is less than the distance between "Vehicle" and "Man", as truck is a type of vehicle.

According to another exemplary implementation, the semantic distance 128 may indicate a distance from a shared or root term. For example, the comparator 126 may determine a semantic distance between "Car" and "Truck" by comparing the semantic distances 128 between "Car" and "Truck" from a root term they share, such as "Vehicle". Then for example, the semantic distance 128 between "Car" and "Truck" may be determined by adding the semantic distance between "Vehicle" and "Car" and "Vehicle" and "Truck".

The comparator 126 may compare the semantic distance 128 to a semantic threshold distance 130 to determine whether the semantic distance 128 exceeds the semantic threshold distance 130. The semantic threshold distance 130 may indicate the furthest or greatest acceptable semantic distance (e.g., 128) allowed between two or more terms. Then, based on whether the semantic distance 128 exceeds the semantic threshold distance 130, the comparator 126 may modify one or more terms of a refined name 118. For example, a refined name 118 may include the terms "Vehicle" and "Man". Then for example, the semantic distance 128 between "Vehicle" and "Man" may be of the value 3 (e.g., Vehicle→Manufacturer→Employee→Man), where the semantic threshold distance 130 may indicate a value of 2. The comparator 126 may then remove, or recommend removal, of "Man" from the refined name 118. The semantic threshold distance 130 may indicate a first threshold for determining similarity between terms of a refined name 118, a second threshold for determining similarity between two or names 110 of various entity classes 106A-E and a third threshold for determining similarity between two or more attributes 108. Example operations associated with determining the semantic distance 128 is further discussed below with reference to FIG. 3.

The modeler 132 may be configured to determine whether a substantial similarity exists between two or more objects of the data model 102 and one or more modifications 134 that may be made to optimize the data model 102. The modeler 132 may determine whether the substantial similarity exists between two or more entity classes 106A-E. The substantial similarity may indicate that two or more of the entity classes 106A-E are substantially, semantically similar. The modeler 132 may, for example, first compare the semantic meanings 124 of the refined names 118 of the first entity class 106B and the second entity class 106C. The modeler 132 may then, for example, compare the semantic meaning 124 of the attributes 108 of the entity classes 106B and 106C. Then, for example, the modeler 132 may determine that a substantial similarity exists between the entity class 106B and the entity class 106C based on the semantic meaning 124 comparisons of the names 110 (e.g., refined names 118) and the attributes 108 (e.g., being less than the semantic threshold distance 130).

Based on whether a substantial similarity exists, the modeler 132 may determine and/or perform one or more modifications 134 to the data model 102. The modification 134 may include any modification designed to optimize, normalize or otherwise increase the efficiency of the data model 102 including, for instance, conforming the names 110 and/or attributes 108 to the naming convention 112, as discussed above. The modifications 134 may include adding, removing, moving or otherwise modifying the entity classes 106A-E, names 110, attributes 108 and/or relationships of the data model 102.

As just referenced, the modeler 132 may create new entity classes in the data model 102. For example, the modeler 132 may determine that multiple attributes 108 are used in a first entity class 106C and a second entity class 106A. Then for example, the modeler 132 may create a new entity class that includes the attributes 108 used in both the first and second entity classes 106C and 106A. The modeler 132 may then, for example, establish relationships in the data model 102 between the first entity class 106C, the second entity class 106A and the newly created entity class.

The modification 134 may be based, at least in part, on a usage 136 as determined by the statistics system 138. The statistics system 138 may be configured to track how often an entity class 106A-E and/or attribute 108 is used (e.g., usage 136) within the data model 102. Then, for example, based on the usage 136, the modeler 132 may determine which entity classes 106A-E and/or attributes 108 may be removed or otherwise modified in the data model 102. For example, the modeler 132 may determine that a substantial similarity (e.g., redundancy) exists between a first entity class 106D and a second entity class 106E. Then, for example, the usage 136 may indicate that the second entity class 106E is used far more often than the first entity class 106D. Then, for example, the modification 134 may indicate removing the first entity class 106D or collapsing it into the second entity class 106E, based on the usage 136 (and adjusting the relationships accordingly).

The modification handler 140 may be configured to generate a message 142 based on the modification 134. The message 142 may include a notification to a user 144 about the modification 134 to be performed on the data model 102. Then, for example, based on the message 142, as provided to the user 144 via an interface 146, the user 144 may accept or reject the modification 134. Based upon the response of the user 144 to the message 142, the modeler 132 may then either implement or disregard the modification 134.

Data models 102 may be complex structures based on detailed semantics and/or linguistics that may be specialized in different industries. Allowing the user 144 the ability to accept/reject modifications 134 to optimize or modify one or more aspects of the data model 102, provides the system 100 with another level of error checking such that the DMO 104 may be prevented from performing modifications 134 to aspects of the data model 102, which while may not be optimal (as determined by the DMO 104), may have been purposely included in the data model 102. Then, for example, based on the user's 144 acceptance/rejection of the modification 134, the DMO 104 may recursively analyze the data model 102 and determine additional modifications 134 that may be made.

The recursive processing of the data model 102 by the DMO 104, where the user 144 may accept/reject modifications 134, allows the DMO 104 to implement a semi-automatic, or recursive, optimization process with regards to the data model 102. The semi-automatic process may allow the DMO 104 to automatically determine which modifications 134 are to be made to the data model 102, but also may allow the user 144 to determine that the semantical analysis performed by the DMO 104 is accurate with regards to the data model 102.

As referenced above, the DMO 104 may both flatten the hierarchy of the data model 102 and normalize the data model 102. In achieving these two goals, the DMO 104 may balance the objective of normalization in increasing reuse of objects of the data model 102 and the objective in flattening the hierarchy of the data model 102 in having fewer recursive levels of inheritance between the objects of the data model 102. The DMO 104 may balance these two objectives and modify the data model 102 based on a determination as to which objectives will lead to greater optimization in the data model 102.

Figure 3:
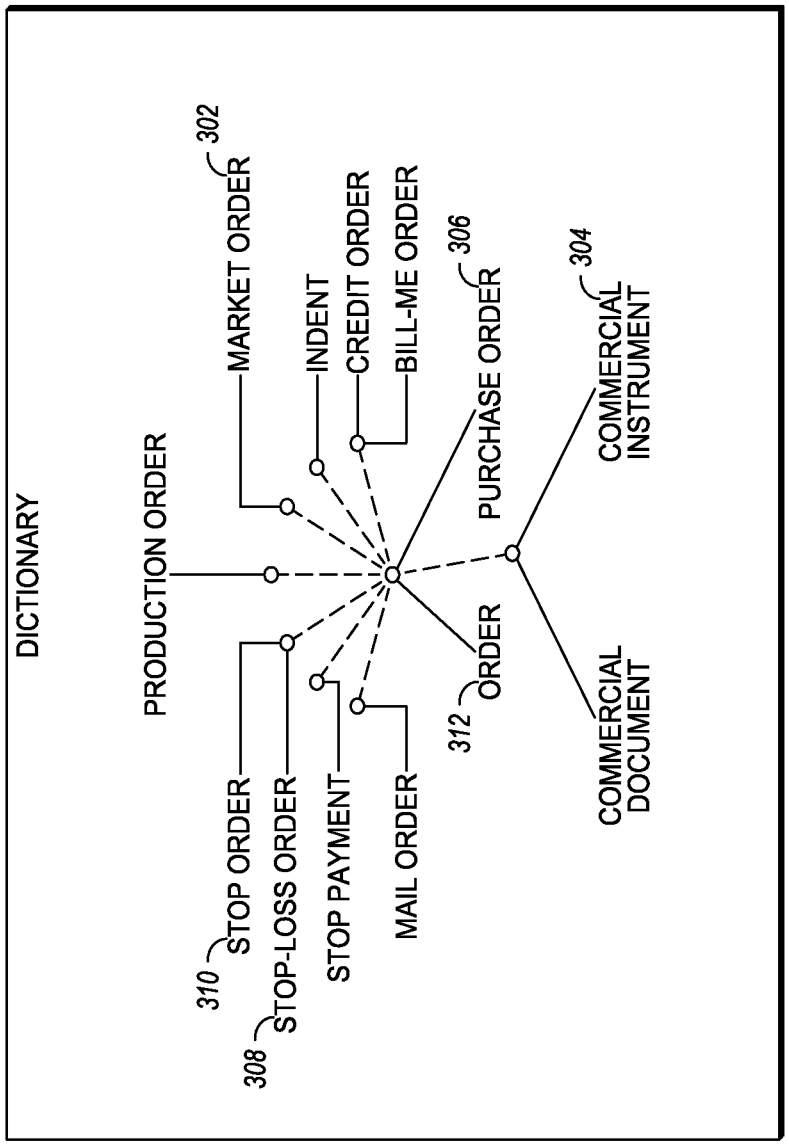
FIG. 3 is an example implementation of a dictionary, according to an example embodiment.

FIG. 3 is an example implementation of a dictionary 123, according to an exemplary implementation. FIG. 3 illustrates an example mapping of terms within the dictionary 123 (of FIG. 1) of the repository 122. The mapping of FIG. 3, may be used, for example, to determine a semantic distance (e.g., 128) between two or more terms or a semantic meaning (e.g., 124) of a term. For example, the semantic meaning of "market order" 302 may include "commercial document" 304 and "purchase order" 306. Or, for example, the semantic distance between "stop-loss order" 308 and "stop order" 310 may be 1, such that each term is 1 term removed from a root or common term (e.g., "order" 312/"purchase order" 306). The lines between the nodes of the mapping of FIG. 3, may indicate relationships between the terms of each node. Example relationships may include synonyms, homonyms, and antonyms.

Figure 4:
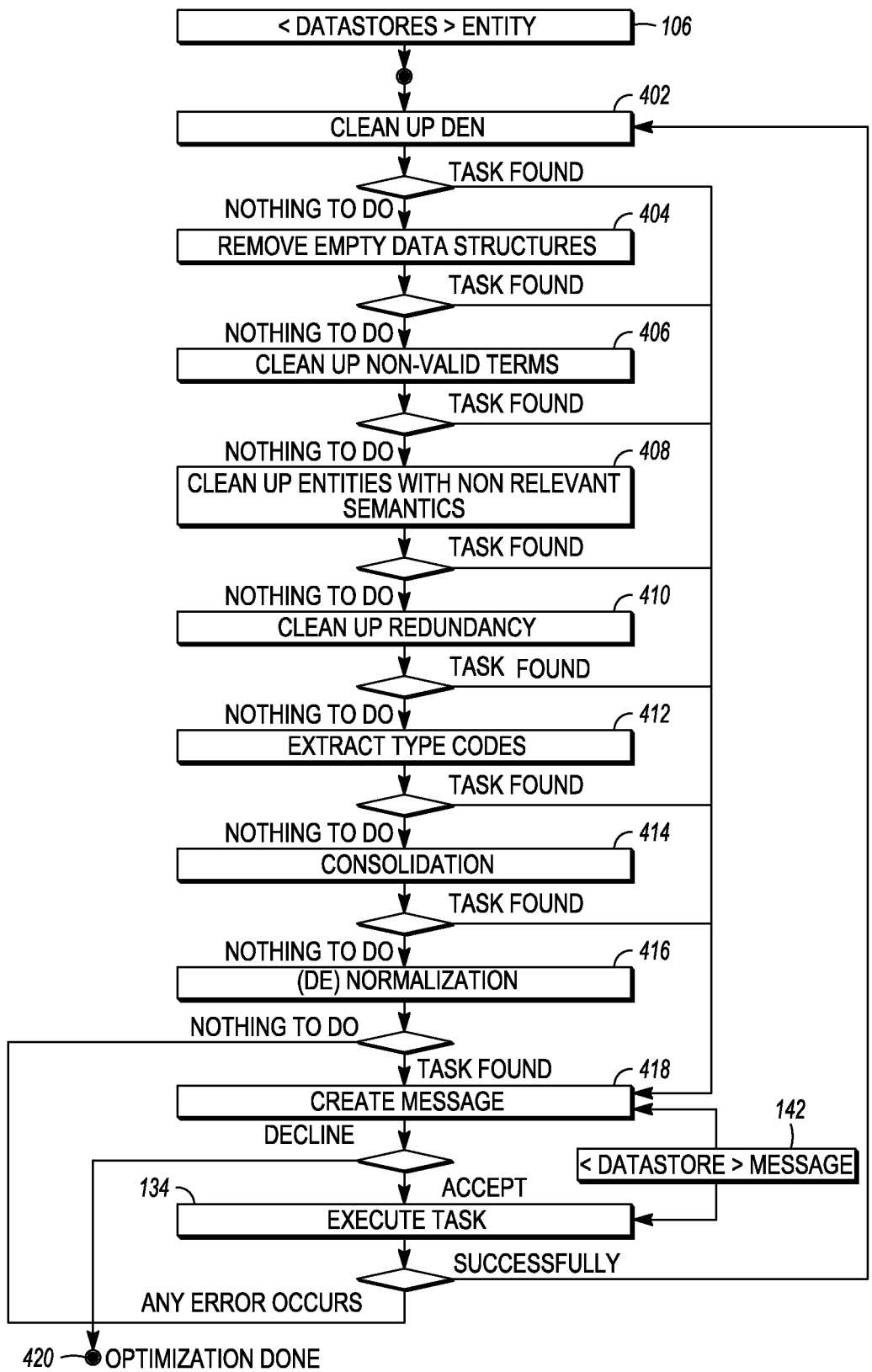
FIG. 4 is an example flowchart illustrating example operations associated with optimizing a data model, according to an example embodiment.

FIG. 4 is an example flowchart 400 illustrating example operations associated with optimizing a data model 102, according to an exemplary implementation. The flowchart 400 may provide that after each step (e.g., 402, 404, 406, 408, 410, 412, 414 and 416) the message 142 may be generated at step 418, and a user 144 may then decline or accept the modification 134. Upon, acceptance of the modification 134, the flowchart may return to step 402. This may allow the DMO 104 to recursively optimize one or more data models 102. If the modification 134 is rejected, the optimization may be completed at 420 and restarted at a later time.

At 402, the dictionary entry name (DEN) of the entity class 106 may be cleaned up. For example, the naming engine 114 may remove invalid terms 116 from the names 110 of entity classes 106A-E. As referenced above, if a name 110 is found to contain an invalid term 116, then a message 142 may be generated requesting acceptance for this modification 134 prior to completion by the DMO 104.

At 404, empty data structures may be removed from the data model 102. For example, the DMO 104 may determine which of the entity classes 106A-E of the data model 102 contain no attributes 108. Then for example, the DMO 104 may remove any of the empty entity classes 106A-E from the data model 102. The DMO 104 also may adjust relationships between the removed entity class and the remaining existing entity classes, to reflect the removal.

At 406, non-valid terms may be cleaned up. For example, the naming engine 114 may modify complex terms 126 in the refined names 118 to simpler terms.

At 408, entities with non-relevant semantics may be cleaned up. For example, the comparator 126 may determine whether the semantic distance 128 between two or more terms of a name 110 (including refined name 118) and/or attribute is less than the semantic threshold distance 130. If the comparator 126 determines, for example, that the semantic distance 128 between two or more terms of a single name 110 is greater than the semantic threshold distance 130, then one or more of the terms may be modified or cleaned up.

At 410, redundancy may be cleaned up. For example, if the entity class 106 contains multiple redundant attributes 108, the modeler 132 may consolidate, remove or otherwise clean up the redundancies. An example redundancy between two attributes 108 may be based on a semantic similarity between their names (e.g., the semantic distance 128 being less the semantic threshold distance 130) and a similar type definition. The type definition may include any number of descriptions as to the type of information that may be stored by the attribute 108, such as, integer, whole number, string and currency.

At 412, type codes may be extracted. An attribute 108 may include a type definition to describe the information to be stored in the attribute. For example, a first name attribute 108 may include the type definition 'string,' and an age attribute 108 may include the type 'integer.' Then, for example, the type 'code' may indicate that a separate file or code list may be referenced to determine what the code refers to. For example, an attribute error_code may include a type 'code' which makes reference to a list of error codes. Then, for example, the list of error codes may include code 32 indicating a printer error, code 43 indicating a software error and code 55 indicating a network error. The modeler 132 may determine that this attribute 108 includes a type code and may extract it and modify the entity class 106A-E and/or attribute 108 accordingly.

At 414, entities may be consolidated. For example, if the modeler 132 determines a substantial similarity between two or more entity classes 106A-E, then the redundancy may be cleaned up. For example, one of the redundant entity classes may be removed, or for example the redundant entity classes may be consolidated into fewer entity classes.

At 416, the data model 102 may be normalized or de-normalized, as appropriate, to improve optimization. The DMO 104 may compare the semantic meanings 124 of the names 110 and the attributes 108 of the entity classes 106A-E to determine whether the attributes 108 are properly positioned within the data model 102. If the DMO 104 determines that an attribute 108, of a first entity class (e.g., 106A) is more closely associated with the attributes 108 of a second entity class (e.g., 106B), the DMO 104 may move the attribute 108 into the second entity class.

The DMO 104 also may determine whether or not to create new entity classes within the data model 102. For example, if multiple attributes 108 of an entity class 106 have similar values (e.g., property qualifiers 208), those attributes 108 may be extracted from the current entity class 106 and placed into a new entity class. An example of this normalization may be seen in FIG. 5.

Figure 5:
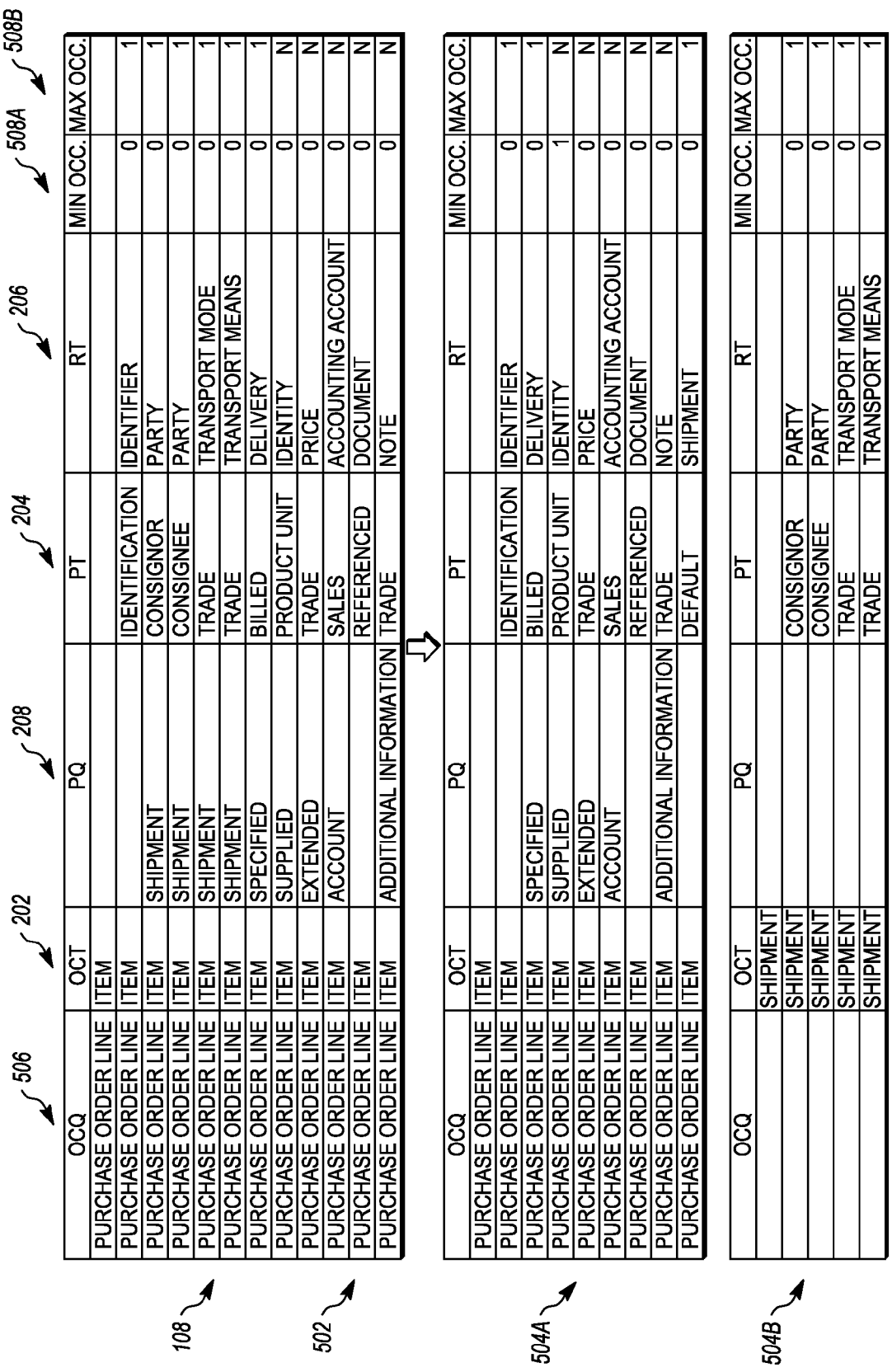
FIG. 5 illustrates an example normalization process of the data model optimizer (DMO), according to an exemplary implementation.

FIG. 5 illustrates an example normalization process of the data model optimizer (DMO) 104, according to an exemplary implementation. In FIG. 5, the entity class "Item" (e.g., OCT 202) may be shown as block 502 prior to normalization. Blocks 504A and 504B show the entity class after normalization where the entity class "Item" has been divided into the entity classes "Item" 504A and "Shipment" 504B. In 504A and 405B, the attributes of "Item" 502 associated with "Shipment" 208 have been moved into the new entity class "Shipment" 504B.

An object class qualifier (OCQ) 506 may be used to further describe or qualify the object class term (OCT) 202. For example, each of the items 202 may be part of the purchase order line 506. The columns 508A and 508B may indicate the minimum and maximum number of values that may be occupied in each attribute 108.

The DMO 104 may normalize the data model 102 into a third normalization form. In a first normalization form, the attributes 108 of an entity class 106A-E may each be atomic or include a single value. For example, a name attribute 108 including a person's first and last name (e.g., Mark Smith) may be separated into a first name attribute 108 (e.g., Mark) and a last name attribute 108 (e.g., Smith).

In a second normalization form, every non-key attribute 108 of an entity class 106A-E may depend on the primary key of the entity class 106A-E. For example, the city field of an attribute 108 may depend on the zip code field of the attribute 108.

In the third normalization form, each attribute 108 of an entity class 106A-E may depend on nothing other than the primary key. For example, in a customer address entity class 106, the zip code may serve as a primary key upon which the city and state are dependent. The DMO 104 may normalize the data model 102 with regards to the three normalization forms.

Figure 6:
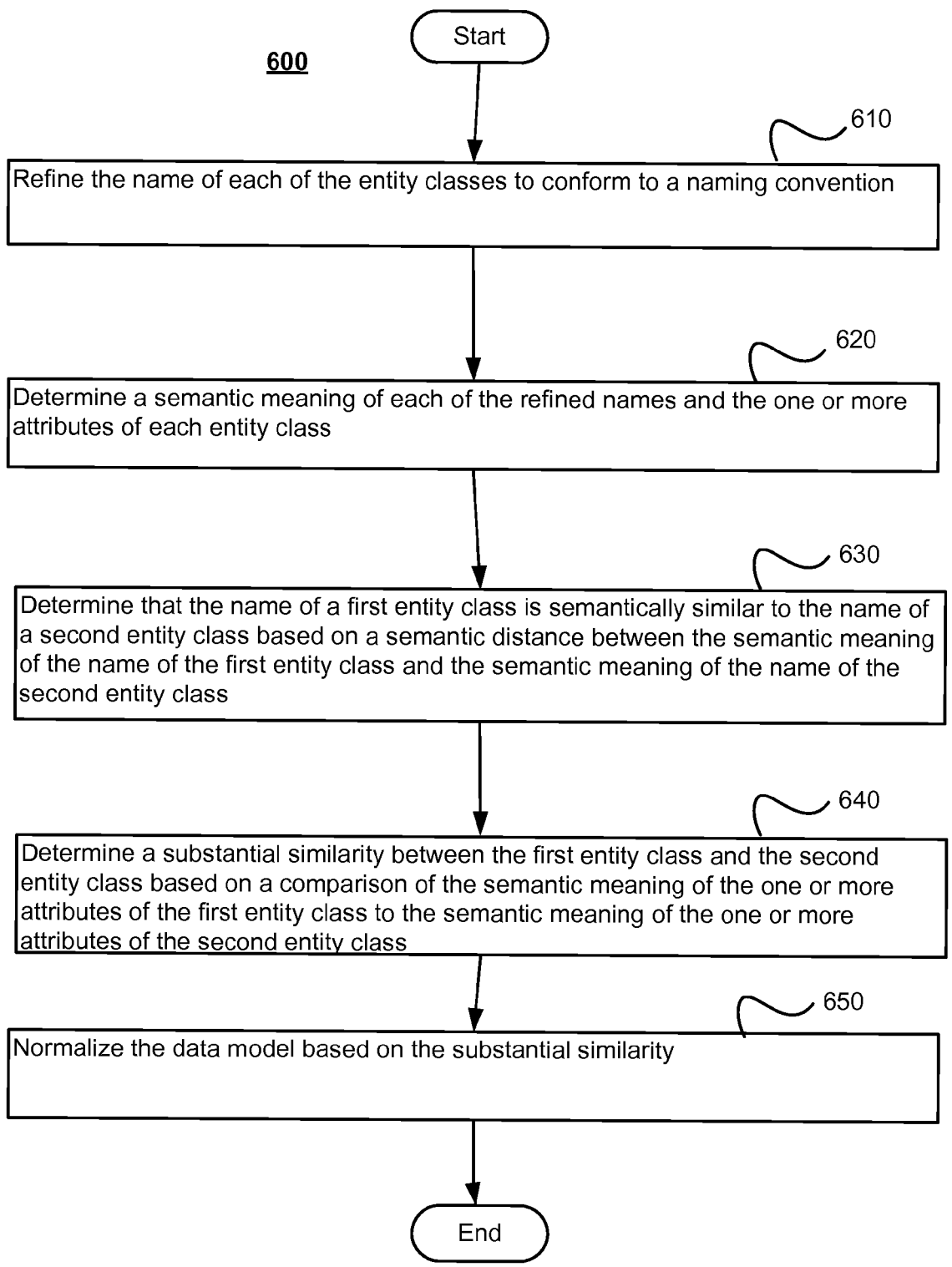
FIG. 6 is an example flowchart of a process illustrating example operations associated with optimizing a data model, according to an exemplary implementation.

FIG. 6 is an example flowchart of a process 600 illustrating example operations associated with optimizing a data model 102, according to an exemplary implementation. Process 600 may include refining the name of each of the entity classes to conform to a naming convention (610), determining a semantic meaning of each of the refined names and the one or more attributes of each entity class (620), determining that the name of a first entity class is semantically similar to the name of a second entity class based on a semantic distance between the semantic meaning of the name of the first entity class and the semantic meaning of the name of the second entity class (630), determining a substantial similarity between the first entity class and the second entity class based on a comparison of the semantic meaning of the one or more attributes of the first entity class to the semantic meaning of the one or more attributes of the second entity class (640) and normalizing the data model based on the substantial similarity (650).

At 610, in FIG. 6, the name of each of the entity classes may be refined to conform to a naming convention. For example, in FIG. 1, the naming engine 114 may refine the names 110 of the entity classes 106A-E to conform to the naming convention 112.

At 620, a semantic meaning for each of the refined names and the one or more attributes of each entity class may be determined. For example, the semantics analyzer 120 may determine the semantic meaning 124 for the refined names 118 and the attributes 108 of the entity classes 106A-E.

At 630, the name of a first entity class may be determined to be semantically similar to the name of a second entity class based on a semantic distance between the semantic meaning of the name of the first entity class and the semantic meaning of the name of the second entity class. For example, the comparator 126 may determine that the semantic meaning 124 of the entity class 106A is semantically similar to the semantic meaning 124 of the entity class 106B based on the semantic distance 128 being less than the semantic threshold distance 130.

At 640, a substantial similarity between the first entity class and the second entity class may be determined based on a comparison of the semantic meaning of the one or more attributes of the first entity class to the semantic meaning of the one or more attributes of the second entity class. For example, the modeler 132 may determine a substantial similarity between the entity class 106A and the entity class 106B based on a comparison (e.g., semantic distance 128 being less than the semantic threshold distance 130) of the semantic meanings 124 of the attributes 108 of the entity class 106A and the entity class 106B.

At 650, the data model may be normalized based on the substantial similarity. For example, the modeler 132 may apply the modification 134 to normalize the data model 102. In FIG. 5, for example, the "Item" entity class in 502 may be divided into the entity classes "Item" and "Shipment" in 504.

Figure 7:
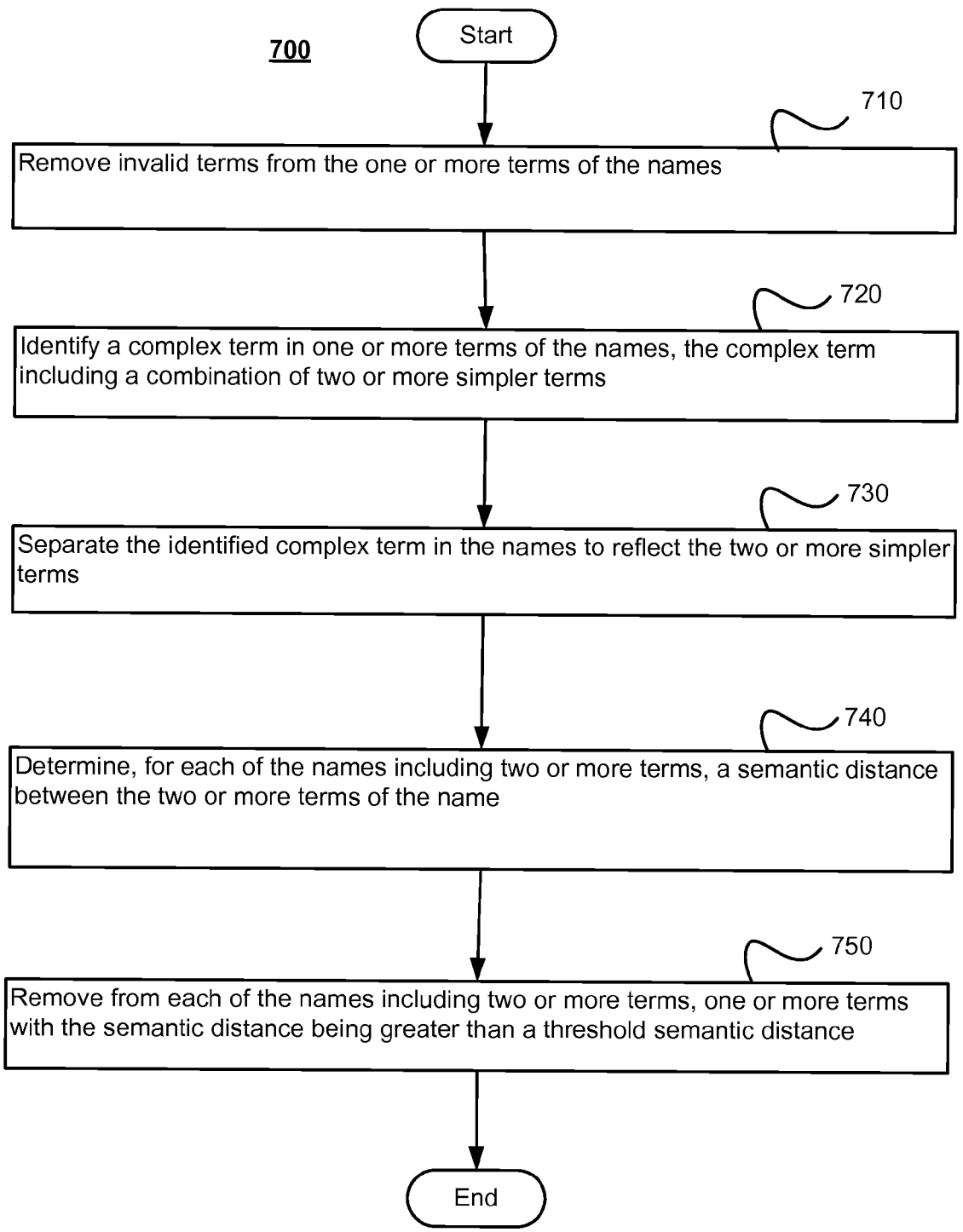
FIG. 7 is an example flowchart of a process illustrating example operations associated with optimizing a data model, according to an exemplary implementation.

FIG. 7 is an example flowchart of a process 700 illustrating example operations associated with optimizing a data model 102, according to an exemplary implementation. Process 700 may include removing invalid terms from the one or more terms of the names (710), identifying a complex term in one or more terms of the names, the complex term including a combination of two or more simpler terms (720), separating the identified complex term in the names to reflect the two or more simpler terms (730), determining, for each of the names including two or more terms, a semantic distance between the two or more terms of the name (740) and removing from each of the names including two or more terms, one or more terms with the semantic distance being greater than a threshold semantic distance (750).

At 710, in FIG. 7, invalid terms may be removed from the one or more terms of the names. For example, in FIG. 1, the naming engine 114 may remove invalid terms 116 from the names 110.

At 720, a complex term may be identified in one or more of the names, where the complex term may include a combination of two or more simpler terms. For example, the naming engine 114 may identify complex terms 126 in one or more of the refined names 118.

At 730, identified complex term may be separated in the names to reflect the two or more simpler terms. For example, the naming engine 114 may separate the complex terms 126, identified in the refined name 118. Then, for example, the naming engine 114 may separate the complex terms 126 into simpler terms in the refined name 118, or may remove one or more of the simpler terms.

At 740, for each of the names including two or more terms, a semantic distance between the two or more terms of the name may be determined. For example, the comparator 126 may determine the semantic distance 128 between two or more terms of the refined name 118.

At 750, from each of the names including two or more terms, one or more terms with the semantic distance being greater than a threshold semantic distance may be removed. For example, the modeler 132 may remove one or more terms with a semantic distance 128 being greater than the semantic threshold distance 130.

Figure 8:
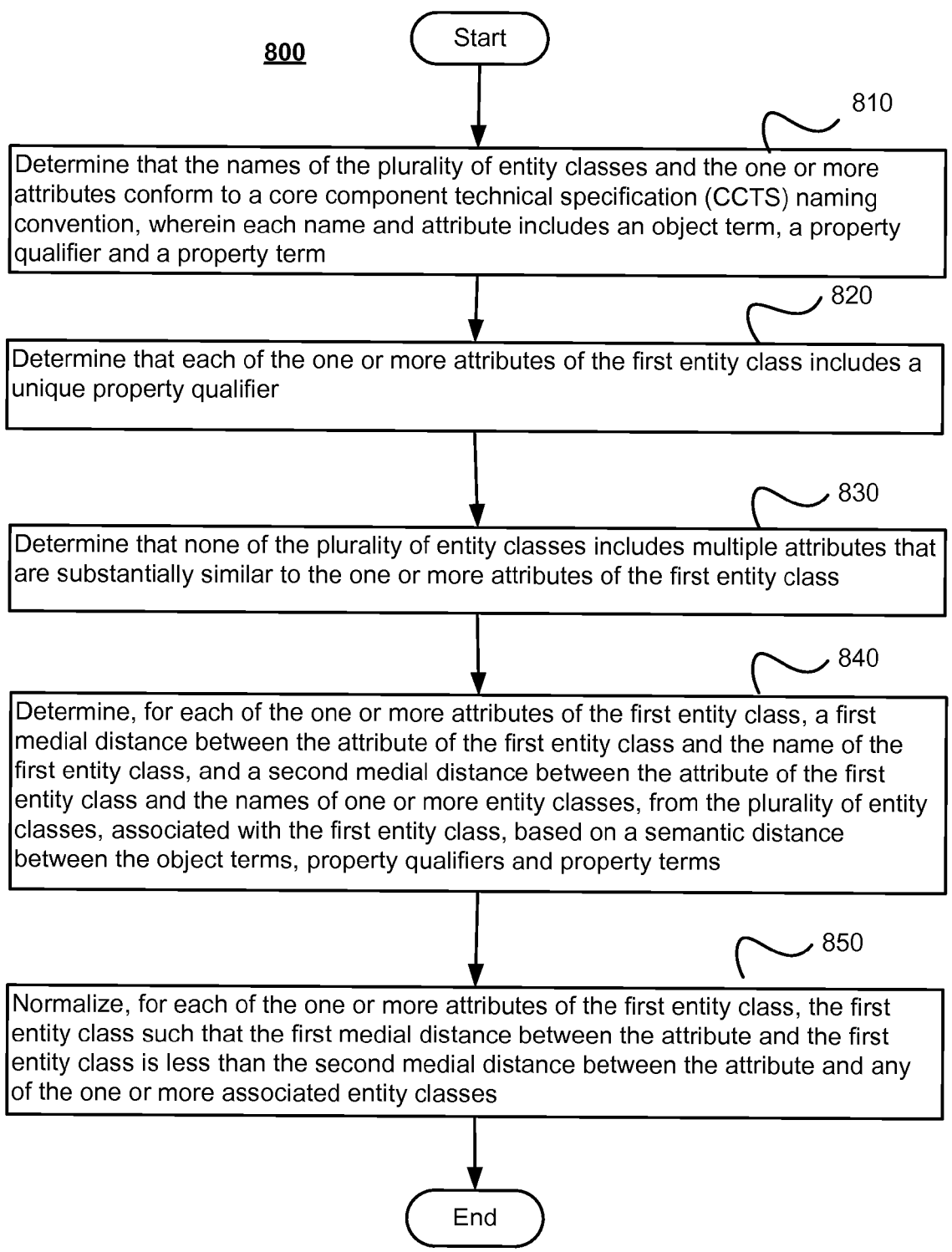
FIG. 8 is an example flowchart of a process illustrating example operations associated with optimizing a data model, according to an exemplary implementation.

FIG. 8 is an example flowchart of a process 800 illustrating example operations associated with optimizing a data model 102, according to an exemplary implementation. Process 800 may include determining that the names of the plurality of entity classes and the one or more attributes conform to a core component technical specification (CCTS) naming convention, wherein each name and attribute includes an object term, a property qualifier and a property term (810), determining that each of the one or more attributes of the first entity class includes a unique property qualifier (820), determining that none of the plurality of entity classes includes multiple attributes that are substantially similar to the one or more attributes of the first entity class (830), determining, for each of the one or more attributes, a first medial distance between the attribute of the first entity class and the name of the first entity class, and a second medial distance between the attribute of the first entity class and the names of one or more entity classes, from the plurality of entity classes, associated with the first entity class, based on a semantic distance between the object terms, property qualifiers and property terms (840) and normalizing, for each of the one or more attributes, the first entity class such that the first medial distance between the attribute and the first entity class is less than the second medial distance between the attribute and any of the one or more associated entity classes (850).

In 810, in FIG. 8, the names of the plurality of entity classes and the one or more attributes may be determined to conform to a core component technical specification (CCTS) naming convention, where each name and attribute includes an object term, a property qualifier and a property term. For example, in FIG. 1, the naming engine 114 may determine that the names 110 and attributes 108 of the entity classes 106A-E conform to the CCTS naming convention 112. Each name 110 and attribute 108, as shown in FIG. 2, may include the object term 202, the property qualifier 208 and the property term 204.

In 820, each of the one or more attributes of the first entity class may be determined to include a unique property qualifier. For example, in FIG. 5, the modeler 132 may determine that each of the attributes 108, of the "Item" entity class in 504, includes a unique property qualifier 208.

In 830, it may be determined that none of the plurality of entity classes includes multiple attributes that are substantially similar to the one or more attributes of the first entity class. For example, in FIG. 5, the modeler 132 may determine that none of attributes 108 of the "Shipment" entity class in 504 are substantially similar to the attributes 108 of the "Item" entity class in 504.

In 840, for each of the one or more attributes of the first entity class, it may be determined that a first medial distance between the attribute of the first entity class and the name of the first entity class, and a second medial distance between the attribute of the first entity class and the names of one or more entity classes, from the plurality of entity classes, associated with the first entity class, based on a semantic distance between the object terms, property qualifiers and property terms. For example, in FIG. 1, the modeler 132 may determine a first medial distance between a first attribute 108 of the entity class 106A and the name 110 of the entity class 106A. The medial distance may be determined based on the semantic distance 128 between the object terms 202, property qualifiers 208 and property terms 204. Similarly, the modeler 132 may determine a second medial distance between a first attribute 108 of the entity class 106A and the name 110 of a second entity class 106B.

In 850, for each of the one or more attributes of the first entity class, the first entity class may be normalized such that the first medial distance between the attribute and the first entity class is less than the second medial distance between the attribute and any of the one or more associated entity classes. For example, in FIG. 1, the modeler 132 may determine the modification 134 to normalize the data model 102 such that the first medial distance between the first attribute 108 of the name 110 of the entity class 106A is less than the second medial distance between the first attribute 108 of the name 110 of the other associated entity classes 106B-E. If for example, the modeler 132 determines that the first medial distance is greater than any of the second medial distances, the modeler 132 may then perform a modification 134 to move the first attribute 108 into a different entity class 106B-E such that the first medial distance is less than the second medial distances.

Figure 9:
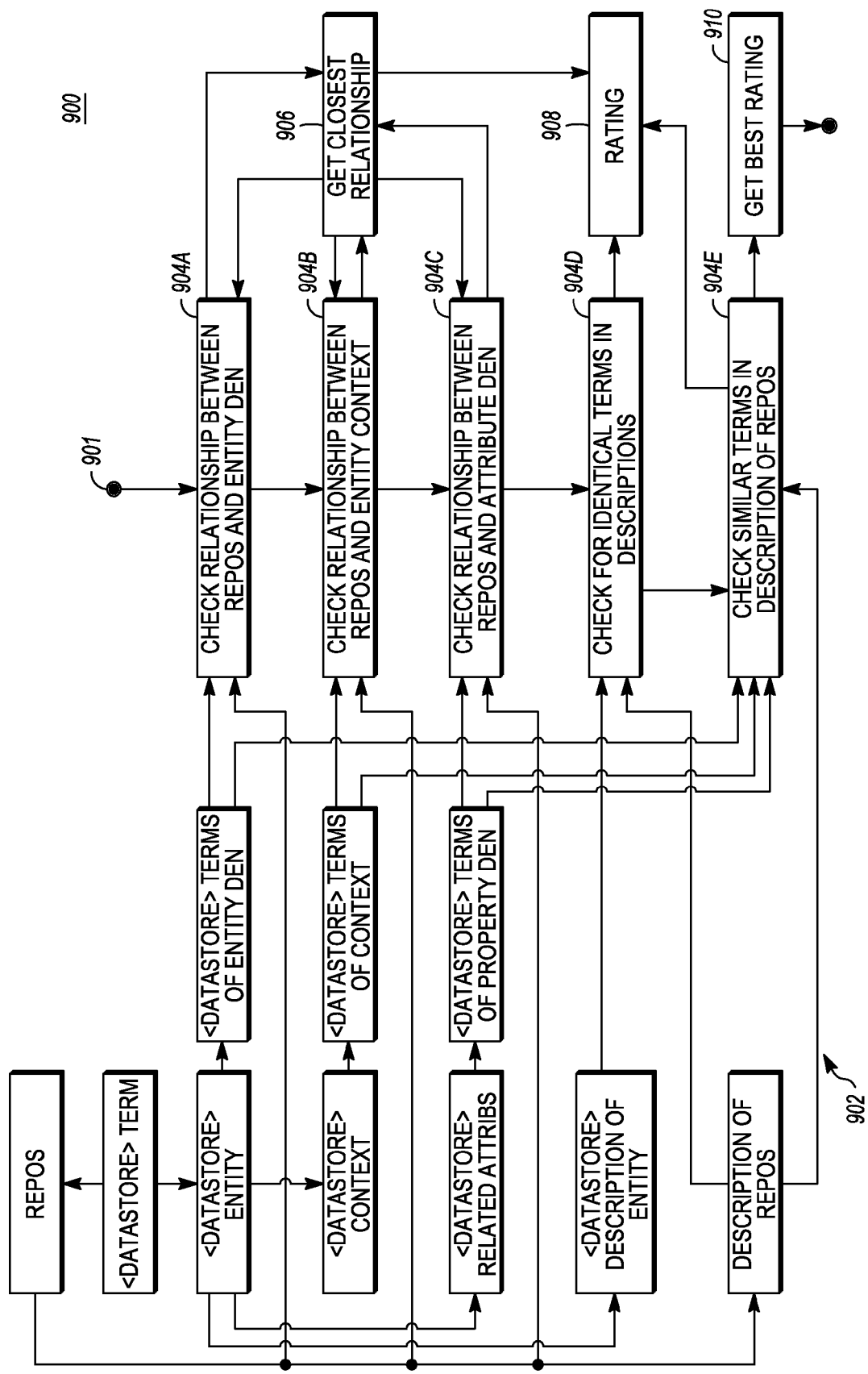
FIG. 9 is an example flowchart of a process illustrating example operations associated with determining a semantic meaning, according to an exemplary implementation.

FIG. 9 is an example flowchart of a process 900 illustrating example operations associated with determining a semantic meaning 124, according to an exemplary implementation. The process 900 illustrates example operations of the semantics analyzer 120, of FIG. 1, in determining the semantic meaning 124 of the names 110 (including refined names 118) and/or attributes 108 of the entity classes 106A-E of the data model 102.

At 901, processing begins. Steps 904A, 904B, 904C, 904D and 904E each illustrate one of any number of various checks that may be performed to determine the semantic meaning 124. 902 indicates various data sources that may be used to perform any of the checks 904A-E.

At 904A, the relationship between the information available in the repository 122 may be compared against the DEN (e.g., name 110, refined name 118) of an entity class 106A-E. Then, for example, the closest relationship (e.g., semantic distance 128) between the information in the repository 122 and the DEN of the entity class may be determined in 906, and a rating may be stored in step 908. The rating may indicate a similarity between objects of the repository 122 and objects of the data model 102. A rating (e.g., 908) may be determined for each of the checks 904A-E. In 910, the best or highest rating may be determined as used to determine the semantic meaning 124 of the term.

At 904B, a context or business context of the entity may be determined and the relationship between the repository 122 and the business context may be determined. For example, various industries may include industry-specific terminology, then, for example, the industry-specific terminology may be used to determine the semantic meaning 124 of the terms.

At 904C, the relationship of the DENs of the attributes 108 of the entity are compared to the repository 122 and the closest relationship 906 may be determined.

At 904D and 904E, descriptions of the entity class and repository 122, respectively, may be determined. The descriptions may include, for example, natural language words, phrases and/or sentences used to describe entities 106A-E and items (e.g., 125A, 125B and 125C) of the repository 122.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A computer-implemented method for refining a name of a single entity class of a data model based on a naming convention wherein the name includes two or more terms, the computer-implemented method comprising executing instructions on a processor for:
   receiving as an input the name of the single entity class of the data model;
   removing invalid terms from the two or more terms of the name of the single entity class of the data model, wherein the invalid terms are terms that are not to be included in names conforming to the naming convention;
   identifying, after removing the invalid terms, a complex term in the name of the single entity class of the data model, the complex term including a combination of two or more simpler terms joined together;
   separating the identified complex term in the name to reflect the two or more simpler terms;
   determining a semantic distance between the separated two or more simpler terms in the complex term in the name of the single entity class of the data model;
   in response to determining the semantic distance of each of the terms in the complex term in the name of the single entity class of the data model, removing from the complex term one or more of the simpler terms based on the semantic distance being greater than a threshold semantic distance; and
   simplifying the name of the single entity class of the data model to the terms remaining after the removal from the complex term of the one or more of the simpler terms based on the determined semantic distance being greater than the threshold semantic distance.

2. The computer-implemented method of claim 1 wherein the removing invalid terms comprises:
   identifying a name of one or more of the entity classes with one or more invalid terms including whitespace and an underscore; and
   removing the invalid terms from the name.

3. The computer-implemented method of claim 1 wherein the identifying the complex term comprises:
   identifying a name including multiple simpler terms;
   determining that two or more of the simpler terms are combined into the complex term, wherein each of the two or more simpler terms is associated with a distinct semantic meaning; and
   separating the two or more combined simpler terms of the complex term into the two or more simpler terms based on the semantic meaning of each of the simpler terms being distinct from the other.

4. The computer-implemented method of claim 1, wherein the two or more simpler terms have distinct semantic meanings.

5. The computer-implemented method of claim 1, wherein:
   the method further comprises determining that a first of the two or more simpler terms is part of a second of the two or more simpler terms; and
   the removing includes removing the first of the two or more simpler terms.

6. The computer-implemented method of claim 1, wherein the determining the semantic distance includes determining a variance between semantic meaning of the two or more simpler terms in the complex term.

7. The computer-implemented method of claim 1, wherein the determining the semantic distance includes comparing semantic distances of the two or more simpler terms from a shared term.

8. The computer-implemented method of claim 1, wherein the determining the semantic distance includes comparing semantic distances of the two or more simpler terms from a root term.

9. The computer-implemented method of claim 1, further comprising comparing the determined semantic distance between the two or more simpler terms in the complex term to the threshold semantic distance.

10. A computer-implemented method comprising executing instructions on a processor for:
receiving as an input the name of a single entity class of a data model;
separating a complex term in a name of the single entity class of a data model into two or more terms;
removing invalid terms from the name of the single entity class of the data model, wherein the invalid terms are terms that are not to be included in names conforming to the naming convention;
determining, after removing the invalid terms, a semantic distance of each of the terms in the complex term in the name of the single entity class of the data model;
in response to determining the semantic distance of each of the terms in the complex term in the name of the single entity class of the data model, removing one or more of the terms in the complex term based on the semantic distance being greater than a threshold semantic distance; and
simplifying the name of the single entity class of the data model to the terms remaining in the name after the removal of the one or more of the terms based on the semantic distance being greater than a threshold semantic distance.

11. The computer-implemented method of claim 10, further comprising removing invalid terms from the name.

12. The computer-implemented method of claim 10, wherein the two or more terms have distinct semantic meanings.

13. The computer-implemented method of claim 10, wherein:
the method further comprises determining that a first of the two or more terms is part of a second of the two or more terms; and
the removing includes removing the first of the two or more terms.

14. The computer-implemented method of claim 10, wherein the determining the semantic distance includes determining a variance between semantic meaning of the two or more terms.

15. The computer-implemented method of claim 10, wherein the determining the semantic distance includes comparing semantic distances of the two or more terms from a shared term.

16. The computer-implemented method of claim 10, wherein the determining the semantic distance includes comparing semantic distances of the two or more terms from a root term.

17. A system comprising:
a naming engine configured to separate a complex term in a name of a single entity class of a data model into two or more terms and remove invalid terms from the name, wherein the invalid terms are terms that are not to be included in names conforming to a naming convention;
a comparator configured to:
determine a semantic distance between the two or more terms in the complex term in the name of the single entity class of the data model;
in response to determining the semantic distance between the two or more terms in the complex term in the name of the single entity class of the data model, remove one or more of the terms in the complex term based on the semantic distance being greater than a threshold semantic distance; and
a modeler configured to simplify the name of the single entity class of the data model to the terms remaining in the name after the removal of the invalid terms and the removal of the one or more of the terms based on their semantic distance being greater than the threshold semantic distance.

18. The system of claim 17, wherein the naming engine is further configured to remove invalid terms from the name.

19. The system of claim 17, wherein:
the naming engine is further configured to determine that a first of the two or more terms is part of a second of the two or more terms; and
the comparator is configured to remove the first of the two or more terms.

20. The system of claim 17, wherein the comparator is configured to determine the semantic distance by comparing semantic distances of the two or more terms from a root term.

* * * * *